July 27, 1937.                H. HEINIS                2,088,264
            APPARATUS FOR SYSTEMATIC DRIVING INSTRUCTION
                Original Filed March 9, 1933    2 Sheets-Sheet 1
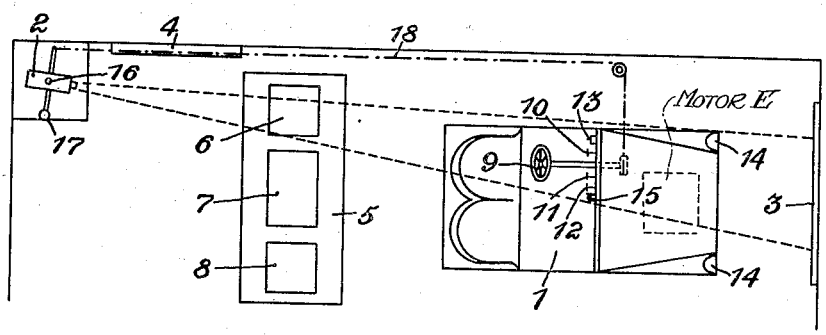
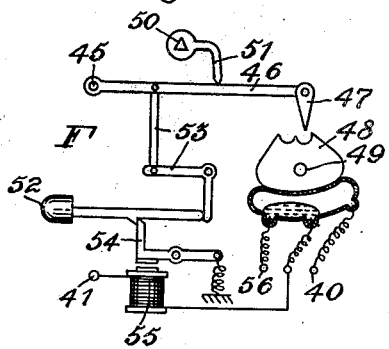
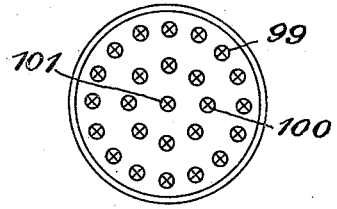
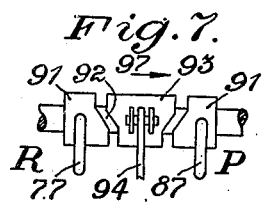
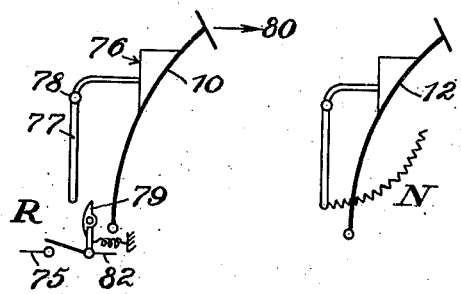 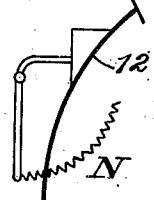
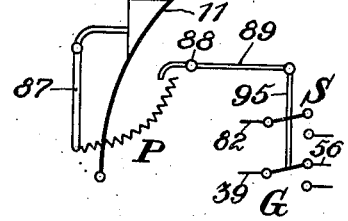

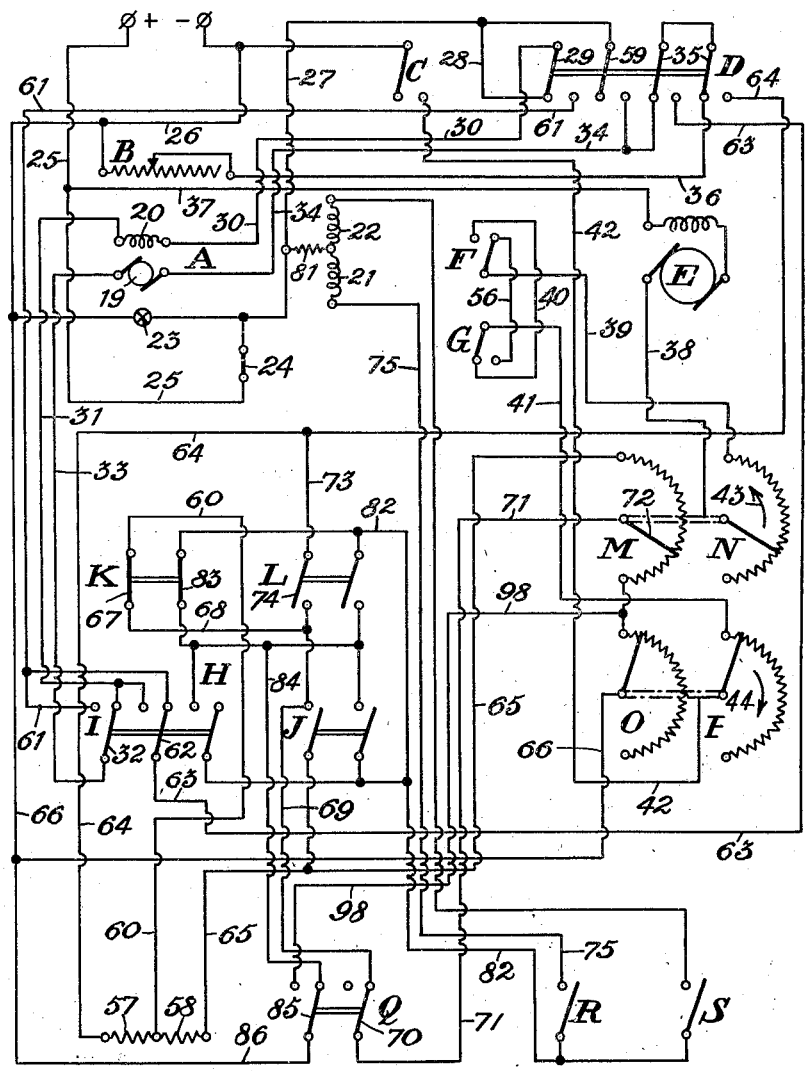

Patented July 27, 1937

2,088,264

UNITED STATES PATENT OFFICE 2,088,264

APPARATUS FOR SYSTEMATIC DRIVING INSTRUCTION

Hugo Heinis, Geneva, Switzerland

Original application March 9, 1933, Serial No. 660,188. Divided and this application June 21, 1934, Serial No. 731,788. In Switzerland March 11, 1932

12 Claims. (Cl. 35—11)

There already exist a great number of apparatuses intended to carry prospective chauffeurs through a series of examinations. These apparatuses styled, for example: "Apparatus for testing a person's fitness to drive", or again "Apparatus for determining the reactive faculty of a person", etc., are all designed solely with a view to effecting movements independently of any exercise, of any preliminary training; for the inventors of these apparatuses are of the opinion, that a man's fitness to drive a motor vehicle may be ascertained through such simple means, without any further test being necessary.

The advantages of the apparatus now to be described, and as compared to those above mentioned, proceed from the fact that the apparatus is not intended to be used for a single test, but for the systematic training of the prospective chauffeur, a training which is carefully regulated, not only as regards the progress made, but also as regards the possibilities the prospective chauffeur has of making that progress.

In the apparatus claimed, the combination already known of a model vehicle, having the essential control parts belonging to the latter, is utilized together with a cinematographic film, which represents the road along which the vehicle is supposed to travel.

It is characterized in that means are provided making it possible to put the operation of the film, at will, under the government of the instructor, or under that of the pupil, and in such a manner that the instructor may alter its direction, speed, and side movement, while the pupil can only alter it by actuating certain parts of the model automobile, and each of the pupil's operations is followed by a corresponding modification in the film, thereby giving the illusion of a change corresponding to the operation effected, having taken place in the run of the vehicle.

The drawings show an embodiment of the subject of the invention, given by way of example.

Fig. 1 is a plan view of the apparatus combined with another apparatus, intended for a preliminary training of the pupil, according to the method indicated, for example in my copending application Serial No. 660,188 of which this application is a division; the apparatus employed in the present application is that disclosed in the said copending application.

Fig. 2 is a diagram of the connections relative to the members of the model automobile.

Fig. 3 is a detail showing the construction of the starting key, and of the button by means of which the motor is stopped.

Figs. 4, 5, and 6 show the electric connections between the clutch pedal, the accelerator pedal, and the brake pedal.

Fig. 7 shows the locking device between the parts actuated by the accelerator, and the foot brake.

Finally Fig. 8 is a front view of one of the head-lights.

In the plan view of the assembled parts, in Fig. 1, is shown at 1 the model automobile, in front of which the cinema apparatus 2 projects its images at 3.

At 4 is disposed an indicator board upon which are disposed the controls, which are placed under the government of the instructor, as well as, for example, the different parts, circuit closers, switches, etc., of the apparatus, according to the above-mentioned copending application Serial No. 660,188.

On a table 5 are disposed different boxes belonging to the apparatus of the above mentioned patent, as well as the boxes belonging to the present apparatus. These different boxes are designated by the reference numerals 6, 7 and 8.

On the model automobile, are provided at 9 the steering wheel, at 10 the clutch pedal, at 11 the brake pedal and at 12 the accelerator. At 13 is disposed a button, which is worked by the foot for dimming the head-lights 14. This model automobile, which is meant to simulate as far as possible a real vehicle, is furnished with an instrument board 15 on which are located the speedometer, starting key, etc.

The cinema apparatus 2 is mounted in such a way as to permit the projection to take place in the two directions, and, if desirable, to permit the projection of endless films. The mounting must also permit the film to be passed at varying speeds, without any danger of the film catching fire; the cinema apparatus is also disposed on a vertical axis 16, and this makes it possible to displace the field of projection sideways, either to the left or to the right. The latter movement is obtained by means of a lever 17, when it is the instructor who operates the projection, or from the steering wheel 9, and by means of a governing cable 18, when it is assumed that the driving of the vehicle is in the hands of the pupil. Means can be provided making it possible to connect the cinema apparatus to the cable 18, or to make it independent of it.

The description of the diagram of Fig. 2 is as follows:

The cinema apparatus is disposed at A, and is furnished with a resistance for regulating the speed B. At C is disposed a switch, by means of which the instructor can transmit the pupil the supply of current necessary for starting the motor of the automobile, while the four pole switch D permits the operation of the cinema apparatus to be placed, at will, either under the government of the parts of the model automobile or under the control of the operator. In the position, in which the switch is shown, it is assumed that the cinema apparatus is operated by the instructor. At E is shown the motor of the automobile, which is an electric motor designed to simulate a gasoline motor, and at F, and G two switches of said automobile. The first of said switches is connected, in a manner to be shown hereinafter, to the foot brake, while the second switch corresponds to the starting key.

The assembly of circuit closers and switches H corresponds to the gear housing of the automobile, and comprises the switch I for direct and reverse drive. The position in which it is shown corresponds to the direct drive, of the circuit closer J for first speed, of the circuit closer K for second speed and of the circuit closer L for third speed.

The resistances M, N, O, P of the motor E, and of the motor of the cinema apparatus, are set in action, on the one hand, by the accelerator, corresponding to the resistances M, N, and on the other hand, by the foot brake corresponding to the resistances O, P; the resistances M, O control the motor of the cinema apparatus, and the resistances N, P control the motor of the vehicle.

A switch Q, which is connected to the hand brake, occupies the position shown, when the hand brake is actuated. Two switches R, and S, are connected to the clutch pedal, and the foot brake respectively, so that when the clutch pedal is being released, the first switch closes, and the second switch closes, when the foot brake is set.

The motor of the cinema apparatus designated by 19, comprises a field winding 20, and turns without stopping, for it acts at the same time as a ventilator of the projecting apparatus. The clutching and the unclutching of the transport mechanism of the film thus takes place mechanically, and this by means of an electro-magnetic clutching-in 21 and unclutching 22 mechanism. The lamp of the cinema apparatus is disposed at 23, and an ordinary circuit closer 24 permits the lamp to be lighted simultaneously with the starting of the motor.

As the switch D and the circuit closer C are in the position shown, the cinema apparatus is, consequently operated by the instructor, and it works in the following way:

By closing the circuit closer 24, the instructor starts the motor 19, 20, and lights the lamp 23; said lamp is lighted by means of a circuit, composed of the positive terminal, of the conductor 25, of the circuit closer 24, of the lamp 23, of the conductor 26, and of the negative terminal, while the circuit of the motor is constituted by the positive terminal, the conductor 25, the circuit closer 24, the conductors 27, 28, the contact 29 of the switch D, the conductor 30, the field winding 20, the conductor 31, the contact 32 of the switch I, the conductor 33, the armature 19, the conductor 34, the contact 35 of the switch D, the conductor 36, the resistance B, the conductor 26 and of the negative terminal.

By acting on the resistance B, the instructor may vary the rapidity of the projection of the cinema apparatus. The movement of the film may be reversed by means of a switch, not shown on the diagram, and be placed on the apparatus itself. The unclutching and clutching-in of the transport movement of the film then is done by hand, instead of being governed by the electromagnets 21 and 22. Thus the instructor can give the pupil the impression of driving fast or slow, of driving backwards, of being at a standstill, or again, and this impression is given by the displacement of the picture projection to the left or to the right, of driving sideways relatively to the ground.

The pupil's duty therefore consists in reacting to those impressions, by putting into action such and such a part of the automobile in order to obtain the desired effect. As a means of control, the instructor disposes of a box, for example, the box 7 disposed on the table 5, and in the interior of which are located a certain number of lamps, each of which is connected to a part of the automobile, and the said box is disposed behind a window, on which appropriate texts, such as "Brake", "Acceleration", "Speed II", "Bear to the left", etc., are written. If, for example, the instructor accelerates the rapidity of the picture projection, the reaction of the pupil, i. e. the actuating of the accelerator, must immediately be noted by the flashing of the inscription "Acceleration." When the projection shows the starting of the automobile, i. e. the successive passing from a fixed rate of projection to different rapidities of projection, the movements of the pupil must successively cause the flashing of the inscription, "Unclutching", "Speed I", "Acceleration", "Unclutching", "Speed II", etc. To all the operations effected by the pupil, the observations of the instructor, by whom the pupil must feel himself closely watched, are for the moment the only answers he receives.

The exercises just described, will form the first stage of the training for which the apparatus is intended.

The second stage differs from the first, in that the instructor puts the motor of the automobile at the pupil's disposition, and this is effected by closing the circuit closer C. The said motor is a nonreversible electric motor, and comprises means intended to imitate the noise and the vibration of the petrol motor, and this is obtained, for example, by the disposition of an eccentrical mass turning with the said motor.

When the pupil takes over the vehicle, the circuit closers R, S are open, the clutch F is in the position shown, and the circuit closer Q is in the other position shown. The brake must at that moment be set.

The pupil then starts the motor by introducing the starting key in the instrument board, and by turning it, i. e. by inversing the position of the switch F. The motor E is thus supplied with current through the following circuit: positive terminal, conductors 25, 37, motor E, conductor 38, resistance N, conductor 39, key F, conductor 40, switch G, conductor 41, resistance P, conductor 42, circuit closer C and back to the negative terminal.

As will be seen, the circuit passes through the resistances N and P, the first of which is set in action by the accelerator, and the second by the foot brake, in such a manner that by accelerating, i. e. by displacing the resistance N in the direction of the arrow 43, the value of the resistance is decreased, while by actuating the brake pedal i. e. by acting on the resistance P in the direction of the arrow 44, the value of the latter is increased. Thus, the pupil is accustomed not only to control the motor by means of his feet, but also to distinguish its reactions and speed by ear.

Moreover, the pupil may at will actuate the hand-brake, and the change speed lever without anything happening, except the flashing of the corresponding inscriptions of the box 7, inscriptions which make it possible to control, as already described, all the pupil's movements; a control which moreover exists during all the stages of the training, consequently, also during the third stage to be hereinafter described.

Fig. 3 shows one possible form of the key F. The apparatus shown is a key-actuated switching device for bringing the motor E into operation. A lever 46, pivoted at the point 45, has at its free end, a plunger, or pick 47, which can be moved into engagement with adjacently disposed cam surfaces on a pivoted mercury switch 48, and to cause it to oscillate alternately first to the left, then to the right. In the position shown, the next oscillation would take place to the right, round the pivot 49. The said movement is caused by the introduction of the key into the triangular notch 50, and by the rotation with this key of a lever 51. A button 52 mounted for reciprocating movement also permits the lever 46 to be lowered through association with the linkage 53, but this is only possible, when the armature 54 is attracted by the electromagnet 55, the coils of which are located in the circuit of the conductors 40, 41 of the motor E. The attraction of the armature of the electro-magnet takes place only when the motor is running. The terminal 56 leads to the conductor and interconnects the switches F and G. When the motor is running, all that is necessary to stop the motor is to press the button 52.

As will be seen hereinafter, the switch C is connected to the brake pedal, in such a manner that by setting the brake, the switch is displaced, and causes the motor to stop.

For the final and third stage of the training, the switch D is put in its other position and this gives the pupil the possibility of having the government of the cinema apparatus entirely at his disposition. At the same time, the connection between the steering wheel 9 and the cinema apparatus 2 is established by means of the cable 18.

In said position of the switch D, the resistances M, O, which are firmly connected to the resistances N, P, influence the rapidity of the projection of the film. Other resistances 57, 58, can also be introduced in the circuit of the cinema motor. The pupil then starts his motor in the manner already described, and then the other parts of the automobile influence the projection of the film in the following manner:

The movements of the steering wheel cause the cinema apparatus to turn, and to displace the projected picture to the left or to the right.

The switch I of the group H is customarily in the position shown, which it departs from, only when the change speed gear is put in the reverse. The circuit closers J, K, L are closed only when use is made of the corresponding speed, first, second or third.

The circuit closer R is so disposed that, for an instant, it closes, every time the clutch pedal is released after use, and the circuit closer S closes, as has already been indicated, when the foot brake is pushed down as far as it can possibly go.

Assuming that the switch I is displaced to the left, and this is effected by putting the gear shifting lever in the reverse position, the result will be that the direction of rotation of the motor of the cinema apparatus will correspond to the reverse drive of the projection, without the film being transported. The circuit of the cinema motor is consequently the following:

Positive terminal, conductor 25, circuit closer 24, conductor 27, contact 59 of the switch D, conductor 34, armature 19 of the motor, conductor 33, contact 32 of the switch I, conductor 61, contact 29 of the switch D, conductor 30, inductor 20 of the motor from right to left, conductor 31, contact 62 of the switch I, conductor 63, contact 35, of the switch D, conductor 64, resistances 57, 58, conductor 65, resistances M and O, conductor 66 and back to negative terminal.

As will be seen, the circuit comprises, besides resistances M and O of the accelerator, and of the foot brake, resistances 57 and 58 in series, and this corresponds to a reduced speed of the motor, i. e. to a minimum speed of the vehicle, as is the case when moving backwards, the speed of which corresponds approximately to the first speed.

Although in this case the actuating of the accelerator is without effect, the actuating of the foot brake, on the contrary, increases the value of the resistance O. This does not exactly correspond to fact, but has thus been provided, owing to the fact that most cinema apparatuses have two directions of projection, which permit the reverse drive of the projection of the film to take place only at a very low speed.

The motor E of the model automobile is, on the contrary, fully dependent on the two resistances N and P, as previously described.

Now let it be supposed, that the first speed once passed through, the pupil passes into the second. In this case, the different elements of the gear box H are in the position shown: the switch I is in the direct drive position and the circuit closer K, which corresponds to the second speed, is closed.

Although the circuit of the motor E has undergone no modifications, the circuit of the motor of the cinema apparatus has, on the contrary, been modified. It is formed in the following manner: positive terminal, conductor 25, circuit closer 24, conductor 27, contact 59 of the switch D, conductor 34, armature of the motor, conductor 33, contact 32 of the switch I, conductor 31, field winding 20 of the motor, but from left to right, conductor 30, contact 29 of the switch D, conductor 61, contact 62 of the switch I, conductor 63, contacts 35 of the switch D, conductor 64, resistance 57, conductor 68, contact 67 of the circuit closer K, conductors 68, 69, contact 70 of the switch Q, conductor 71, lever 72 of the resistance M, resistance M, resistance O, conductors 66, 26 and back to negative terminal.

It may be seen here that, contrary to the preceding case, the current passes from left to right in the field winding 20 of the cinema motor, and this corresponds to an inverse direction of rotation of said motor. The circuit is closed by the resistance 57, and the two resistances M and O; this means that the cinema motor will be influenced both by the movement of the accelerator, and by the actuating of the foot brake. If the pupil had dropped into first, by closing the circuit closer J the two resistances 57, 58 would have been in series in the circuit, while in direct drive with the circuit closer L closed, the two resistances are out of circuit. In fact, in this case, the circuit is closed from the contacts 35 of the switch D directly by the conductor 64, then the conductor 73 and the contact 74 of the circuit closer L, continue through the conductors 69 and 71 of the circuit previously described. The resistances 57, 58 thus determine the different speeds corresponding to the different positions of the change speed gear lever.

The movements, now described, determine only the direction of rotation, and the speed of the cinema motor, without, however, this action being necessarily transmitted to the film, because said film has until this point remained unclutched. The clutching-in and unclutching of the film is effected as already said, by means of relays 21 and 22, and in such a manner that a momentary flow of current on either of the two coils is sufficient to cause the clutching-in or unclutching.

The coil 21, which causes the clutching-in, is connected by means of the conductor 75 to the circuit closer R of the clutch pedal, which itself acts in the following way, reference being made to detail in Fig. 4.

The pedal 10 comprises a surface 76, by means of which it displaces an auxiliary lever 77, which is pivoted at 78, and which lever comes to rest behind the pawl 79, so as momentarily to close the circuit closer R, when the pedal is released in the direction of the arrow 80. The closed circuit is accordingly the following: positive terminal, conductor 25, circuit closer 24, protecting resistance 81, coil 21, conductor 75, circuit closer R, conductor 82, contact 83 of the circuit closer K (in the aforementioned case with the running in second speed), conductor 84, contact 85 of the switch Q, conductors 86, 66, 26 and back to negative terminal. It will be seen that the putting into action of the film can only take place, when one of the speeds is engaged, and only when the switch Q occupies the position shown, i. e. when the hand brake is not applied.

Further, it is equally necessary that the film should stop completely when the foot brake is set, and this is effected by means of a device, shown in detail Figure 6, and which device, when the brake is set, closes the circuit closer S, and causes the energizing of the relay 22 of the unclutching.

According to this figure, the foot brake 11 also acts through the intermediary of an auxiliary lever 87, on the resistance F, said lever encountering at the end of its course, another lever 88, which oscillates about a point 89, and which lever actuates, not only the circuit closer S, but also the switch G, and this action stops the motor itself of the automobile, but only in the case when the actuating of the brake is effected without the unclutching being effected at the same time. Said result is obtained by means of the mechanical device, shown in Fig. 7.

In said figure may be seen the upper arms of the auxiliary levers 77 and 87 of the clutch pedal, and of the foot brake. Both turn about a common axis 90. The cams 91 can turn about said axis, without, however, it being possible for them to move longitudinally over the latter, and have inclined planes 92 on their opposite faces, between which faces is disposed a rotative member 93 which comprises corresponding inclined faces. A rod 94 which is fixed to the rotative member, acts through the intermediary of a device, not shown, in such a manner as to connect the switch G to the rod 95 of the lever 89, or to separate said switch from said rod, as may be the case.

By acting solely on the unclutching lever, the inclined plane 92, which is dependent on said lever, pushes the member 93 in the direction of the arrow 97, while an action on the lever 87 only produces a contrary effect. If, on the contrary, both levers 77 and 87 of the unclutching and of the brake respectively, are actuated at once, the member 93 is turned by the action of the two inclined planes, and its rotation through the rod 94 separates the switch G from the bar 95, and the actuating of the brake does not then stop the motor E.

Customarily, the hand brake must not be utilized to brake the moving vehicle, it must, on the contrary, be applied every time the pupil leaves the automobile, or when he takes it over. When said brake is applied, the switch Q is on the left, and this does not prevent the rotation of the motor of the cinema apparatus, which is effected by means of a circuit leading through the resistances 57, 58 and the full resistance M, from the positive terminal to resistances 57, 58, conductor 65, said resistance M, conductor 98, contact 85 of the switch Q, conductor 86 and back to the negative terminal; the cinema motor is then turning at a speed sufficient for the ventilation of the apparatus.

Further, the operation of the shift speed gear does not cause any effect, as long as the hand brake is applied, because the current which supplies the apparatuses of the gear box H, always passes through the conductors 69 and 71, which are only interconnected by means of the contact 85, when the brake is released.

The switches F and G are interconnected in such a manner that the motor E can only turn, when the key is introduced in F (see also Fig. 3), and when the foot brake is not actuated, or does not act on the switch G.

It is, however, also possible to close the circuit of the motor by means of the conductor 40, in the case when the brake is being applied as far as it will go (the switch G, i. e. in the other position from that shown), the key F is in the position shown. But, the operation of the shift speed gear is then without effect, because the switch F has unclutched the film by means of the relay 22.

Fig. 5 shows a simple manner of connecting the lever 12 of the accelerator to the corresponding resistance N. As the pedal is depressed, the lever connected therewith, and which is connected in the circuit of the resistance N, sweeps upwardly across the latter in the manner of an armature, and cuts the resistance out of circuit, increasing the current supply to the motor.

A speedometer may be provided, and disposed on the instrument board, and connected directly with the motor E, or better connected by means of a mechanical shift speed gear, which is actuated by the shift speed gear lever, at the same time as the gear box H. In this manner, the pupil is better enabled to determine the difference in speed at which he is supposed to be travelling.

The means necessary for operating the headlights may be provided, either by means of a key, or by means of, for example, a button 13. The headlights themselves must be constructed in such a manner that the pupil may be able to determine the difference in their intensity of lighting without their inconveniencing in any manner the projection of the film.

Fig. 8 shows the front view of a headlight which has been adapted for this purpose. It comprises two circles of small lamps 99 and 100, and a small central lamp 101. The said small lamps are very low in intensity. The exterior circle 99 corresponds to bright lights, the inner circle to dimming lights, and the lamp 101 to warning signal.

In order that the pupil may thoroughly understand the operation of the head lights, the latter may turn about their vertical axis, and consequently be directed backwards, towards the pupil, so that the pupil may note the differences in the lighting which it supplies.

What I claim is:—

1. An assembly for driving instruction, comprising a model automobile, a cinematographic screen disposed in front of said automobile, a swingably mounted cinematographic projection device adapted to be focussed on said screen, means interconnecting said projection apparatus with the steering wheel of said model automobile whereby the pupil can swing the projection device to vary the position of the projected image of the road, thereby producing the illusion that the automobile moves on the road, and means connected with the said projection apparatus whereby the instructor can manually control the movement of said projection apparatus, in order to confront the pupil with unexpected road problems.

2. Apparatus for driving instruction, comprising a source of current supply, a cinematographic projection apparatus, a motor therefor, an electric model automobile motor, circuits for each of said two motors, a switch adapted in one position to connect the projection motor circuit alone across the supply source, and in the other position to connect the circuits of both motors across said supply source, two variable resistances in the automobile motor circuit, two variable resistances, each mechanically interconnected to a corresponding one of said first-mentioned resistances, a circuit auxiliary to said projection motor circuit, and adapted to be connected therein, and in which the second two resistances are inserted, an accelerator pedal, and a brake pedal, depression of the accelerator pedal causing movement of the interconnected armatures of one set of resistances, to decrease the effective resistance and to accelerate the speed of both motors, and depression of the brake pedal inserting resistance in each motor circuit, slowing the speed thereof.

3. Apparatus for driving instructions, an electric motor, means associated with said motor whereby the motor is made to sound like an internal combustion engine, a circuit for said motor including a source of current supply, an accelerator pedal, a brake pedal, two variable resistances in said circuit, the armatures of which are movable in inverse directions, and one connected to the brake and the other to the accelerator pedal, and a switch in said circuit for closing the same and comparable to an automobile starter, the accelerator-connected resistance being normally in circuit, and depression of the accelerator pedal decreasing its value, while the brake-connected resistance is normally out of circuit, depression of the brake pedal increasing its value.

4. Apparatus for driving instruction, comprising a source of current supply, a cinematographic projection apparatus, a motor therefor, an electric model automobile motor, circuits for each of said two motors, a switch adapted in one position to connect the projection motor circuit alone across the supply source, and in the other position to connect the circuits of both motors across said supply source, two variable resistances in the automobile motor circuit, two variable resistances, each mechanically interconnected to a corresponding one of said first-mentioned resistances, a circuit auxiliary to said projection motor circuit, and adapted to be connected therein, and in which the second two resistances are inserted, an accelerator pedal, a brake pedal, depression of the accelerator pedal causing movement of the interconnected armatures of one set of resistances, to decrease the effective resistance and to accelerate the speed of both motors, and depression of the brake pedal inserting resistance in each motor circuit, slowing the speed thereof, and an additional switch for connecting the automobile motor circuit and its corresponding resistances separately across the source of current supply.

5. Apparatus for driving instruction, comprising a source of current supply, a cinematographic projection apparatus, a motor therefor, an electric model automobile motor, circuits for each of said two motors, a switch adapted in one position to connect the projection motor circuit alone across the supply source, and in the other position to connect the circuit of both motors across said supply source, two variable resistances in the automobile motor circuit, two variable resistances, each mechanically interconnected to a corresponding one of said first-mentioned resistances, a circuit auxiliary to said projection motor circuit, and adapted to be connected therein, and in which the second two resistances are inserted, an accelerator pedal, a brake pedal, depression of the accelerator pedal causing movement of the interconnected armatures of one set of resistances, to decrease the effective resistance and to accelerate the speed of both motors, and depression of the brake pedal inserting resistance in each motor circuit, slowing the speed thereof, a plurality of resistances associated solely with the auxiliary circuit for the projection motor, a plurality of branch circuits, a gear shift lever for controlling switches in said branch circuits, and switches in said branch circuits whereby in dependence of the position of the gear shift lever, the branch circuits, together with the said last-mentioned resistances, are connected in the said auxiliary circuit so that the projection motor is either reversed with all the last-mentioned resistances in circuit, or is directly driven with all, part, or none of the said last-mentioned resistances in circuit.

6. Apparatus for driving instruction, comprising a source of current supply, a cinematographic projection apparatus, a motor therefor, an electric model automobile motor, circuits for each of said two motors, a switch adapted in one position to connect the projection motor circuit alone across the supply source, and in the other position to connect the circuits of both motors across said supply source, two variable resistances in the automobile motor circuit, two variable resistances, each mechanically interconnected to a corresponding one of said first-mentioned resistances, a circuit auxiliary to said projection motor circuit, and adapted to be connected therein, and in which the second two resistances are inserted, an accelerator pedal, a brake pedal, depression of the accelerator pedal causing movement of the interconnected armatures of one set of resistances, to decrease the effective resistance and to accelerate the speed of both motors, and depression of the brake pedal inserting resistance in each motor circuit, slowing the speed thereof, and means cooperating with said auxiliary circuit for reversing the direction of rotation of said projection motor, and for producing an open circuit in that resistance connected to the projection motor circuit which is controlled by the accelerator pedal.

7. Apparatus for driving instruction, comprising a source of current supply, a cinematographic projection apparatus, a motor therefor, a clutch between said projection apparatus and said motor, a model automobile, pedals thereon simulating the brake and clutch pedals of a real automobile, coils for clutch, one for causing engagement of the clutch and the other for unclutching the same, circuits for said coils, the circuit for that coil which causes engagement of the clutch being adapted to be closed in the normal position of the clutch pedal so that the projection apparatus will operate, and to be opened upon depression thereof, to take the projection apparatus out of operation, and the other circuit being connected to the brake pedal, depression of the brake pedal energizing said other circuit, thereby causing the disengagement of said clutch and the consequent stopping of the projection apparatus.

8. Apparatus for driving instruction, comprising a source of current supply, a cinematographic projection apparatus, a motor therefor, a clutch between said projection apparatus and said motor, a model automobile, pedals thereon simulating the brake and clutch pedals of a real automobile, coils for said clutch, one for causing engagement of the clutch and the other for unclutching the same, circuits for said coils, the circuit for that coil which causes engagement of the clutch being adapted to be closed in the normal position of the clutch pedal so that the projection apparatus will operate, and to be opened upon depression thereof, to take the projection apparatus out of operation, the other circuit being connected to the brake pedal, depression of the brake pedal energizing said other circuit, thereby causing the disengagement of said clutch and the consequent stopping of the projection apparatus, a hand brake, and a switch in the clutching coil circuit and connected with said hand brake, actuation of the hand brake operating the switch to prevent the clutching-in of the projection apparatus.

9. In an apparatus for driving instruction having a motor, a foot brake, a supply circuit for said motor and a circuit for the foot brake, a switch, comprising a pivoted lever, a key-actuated member for depressing said lever, in the manner of the insertion and turning of the key of the conventional automobile, a pick on one end of said lever, a pivoted switching element containing mercury as a conducting element adapted to be rocked from one side to the other by said pick, depending upon the initial position of said mercury switch, three leads to said switching element, only two of which can be connected at a time by the mercury, the central lead being always covered by the mercury and being cut into the supply circuit, and the other two leads being connected into opposite sides of the circuit for the foot brake, and additional and emergency means for rocking said lever when the motor is running, to deenergize the latter quickly, said additional means comprising a button, linkage pivotally interconnecting said button and said lever, means normally holding said button in its inoperable position, when the motor is deenergized, and an electro-magnet connected in said motor circuit for attracting said last-mentioned means, thereby releasing said button, upon energization of the motor, so that the button can then be operated manually to open the supply circuit.

10. In an apparatus for driving instruction, a motion picture projection device, an electric motor for driving said apparatus, a clutch between said projection device and said motor, a coil controlling said clutch, to bring it into and out of its engaged position, a circuit for said coil, a model automobile, a clutch pedal in said automobile, a pivoted lever adapted to be rocked upon depression of said pedal, a switch in said circuit, spring means urging said switch into its closed position, a pawl normally holding said switch in its open position, and adapted to be swung by said lever upon depression of the clutch-pedal, to release the switch into its closed position, thereby energizing said coil and causing the engagement of said clutch, and means for moving the pawl to open the switch after passage of the lever.

11. In an apparatus for driving instruction, a model automobile, a brake pedal therefor, an electric motor in said automobile, a circuit for said motor, a pivoted lever adapted to be rocked by said brake pedal upon depression of the latter, and a variable resistance in the circuit of said motor, for which resistance said lever serves as an armature, the lever being so constructed and arranged with respect to the resistance that depression of the brake pedal will result in corresponding decrease in the speed of the electric motor.

12. In an apparatus for driving instruction, a model automobile, an electric motor in said automobile, a supply circuit for said motor, a motion picture projection apparatus, a second motor for actuating said projection apparatus, motor, a clutching device for clutching and declutching the projection apparatus with respect to said second motor, a circuit for declutching said clutching device, a brake pedal for said automobile, a pivoted lever adapted to be rocked by said brake pedal upon depression of the latter, a variable resistance in the circuit of said first motor, for which said lever serves as an armature, the lever being so constructed and arranged with respect to the resistance that depression of the brake pedal will result in corresponding decrease in the speed of the electric motor, a second pivoted lever, adapted to be rocked by said first lever after the latter has completely traversed said resistance, and a switch in the said declutching circuit fast to said second lever, and hence actuated by said first lever to disconnect the motion picture projection apparatus after all resistance has been cut into the motor circuit, and the motor has been brought to its speed corresponding to full depression of the brake pedal.

HUGO HEINIS.